(12) United States Patent
Wang et al.

(10) Patent No.: US 6,396,837 B1
(45) Date of Patent: May 28, 2002

(54) METHOD AND SYSTEM FOR MAPPING VIRTUAL CONNECTIONS TO ASYMMETRIC DIGITAL SUBSCRIBER LINE LATENCY PATHS

(75) Inventors: Ray Wang, McLean, VA (US); Paul Y. B. Shieh, Westborough, MA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/518,391

(22) Filed: Mar. 3, 2000

(51) Int. Cl.$^7$ ................................................ H04L 12/56

(52) U.S. Cl. .............................. 370/395.21; 370/395.6; 370/466

(58) Field of Search ................................. 370/395, 230, 370/231, 235, 236, 248, 252, 465, 466, 467, 469, 419, 480, 395.1, 395.2, 395.3, 395.4, 395.42, 395.43, 395.5, 395.6, 395.61

(56) References Cited

U.S. PATENT DOCUMENTS

| | | |
|---|---|---|
| 5,408,260 A | 4/1995 | Arnon |
| 5,519,731 A | 5/1996 | Cioffi |
| 5,521,906 A | 5/1996 | Grube et al. |
| 5,619,505 A | 4/1997 | Grube et al. |
| 5,627,501 A | 5/1997 | Biran et al. |
| 5,822,374 A | 10/1998 | Levin |
| 5,889,856 A | 3/1999 | O'Toole et al. |
| 5,910,970 A | 6/1999 | Lu |
| 5,999,518 A * | 12/1999 | Nattkemper et al. ........ 370/258 |
| 6,049,531 A * | 4/2000 | Roy ............................ 370/260 |
| 6,208,637 B1 * | 3/2001 | Eames ......................... 370/352 |

FOREIGN PATENT DOCUMENTS

| | | |
|---|---|---|
| WO | WO 99/12330 | 3/1997 |
| WO | WO 98/47251 | 10/1998 |

OTHER PUBLICATIONS

Black, Uyless, ATM Foundation For Broadband Networks, 1995, PP: 209, 222–227.*
Newton's Telcom Dictionary, 1996, PP:661.*
ADSLRForumTR–001 "ADSL Forum System References Model," ADSL Forum Technical Report, May 1996, pp. 1–7.
Technical Report TR–002, "ATM Over ADSL Recommendations," ADSL Forum Technical Report, Mar. 1997, pp. 1–17.
Technical Report, TR–007, "Interfaces and System Configurations for ADSL: Customer Premises," ADSL Forum Technical Report, Mar. 1998, pp. 1–26.
Kyees, P.J. et al., ADSL: A New Twisted–Pair Acces to the Information Highway, IEEE Communications Magazine, vol. 33, Issue 4, Apr. 1995, pp. 52–60.
Huang, Yin–Hwa et al., Design of an MPEG–Based Set–Top Box for Video on Demand Services, Acoutics, Speech, and Signal Processing, 1995, ICASSP–95, 1995 International Conference, vol. 4, ISBN:0–7803–2431–5, May 9–12, 1995, pp. 2655–2658.

* cited by examiner

*Primary Examiner*—David R. Vincent
(74) *Attorney, Agent, or Firm*—McDonnell Boehnen; Hulbert & Berghoff; Stephen Lesavich

(57) ABSTRACT

A method and system for mapping virtual connections to asymmetric digital subscriber line ("ADSL") latency paths. A request for virtual connection from a transport network (e.g., Asynchronous Transport Mode, Frame Relay, etc.) with a desired service category (e.g., quality-of-service) and a desired latency is mapped to an ADSL device latency interface by checking a latency mapping policy. This mapping provides a virtual connection with a desired service category and a desired latency over ADSL links. The latency mapping includes an embedded service category mapping from a transport network to latency paths at an ADSL transmission convergence sub-layer allowing differential services to be provided for user data based on a desired service category. The latency mapping mechanism may help provide use of end-to-end service categories such as quality-of-service categories, over real-time ADSL links.

20 Claims, 5 Drawing Sheets

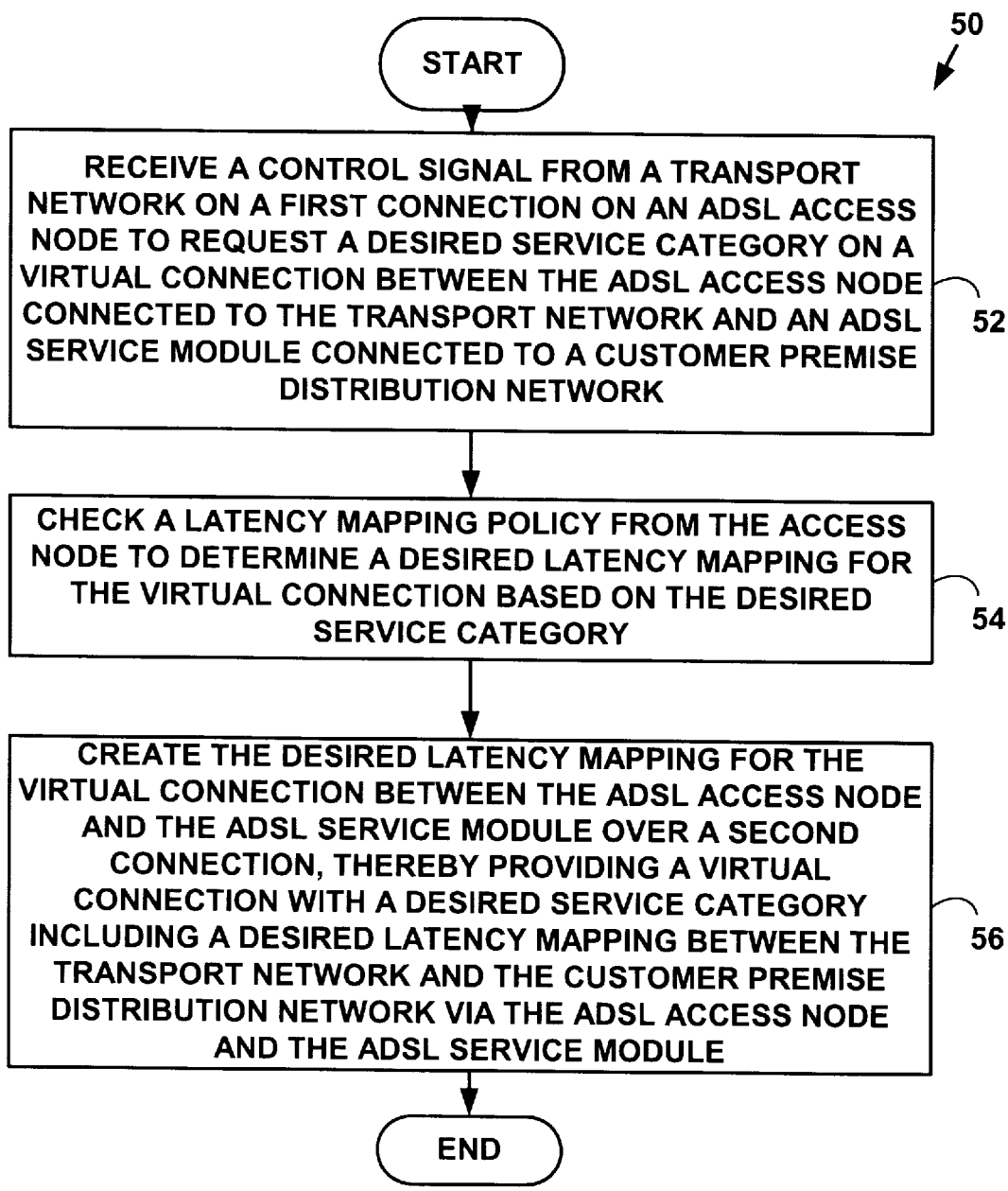

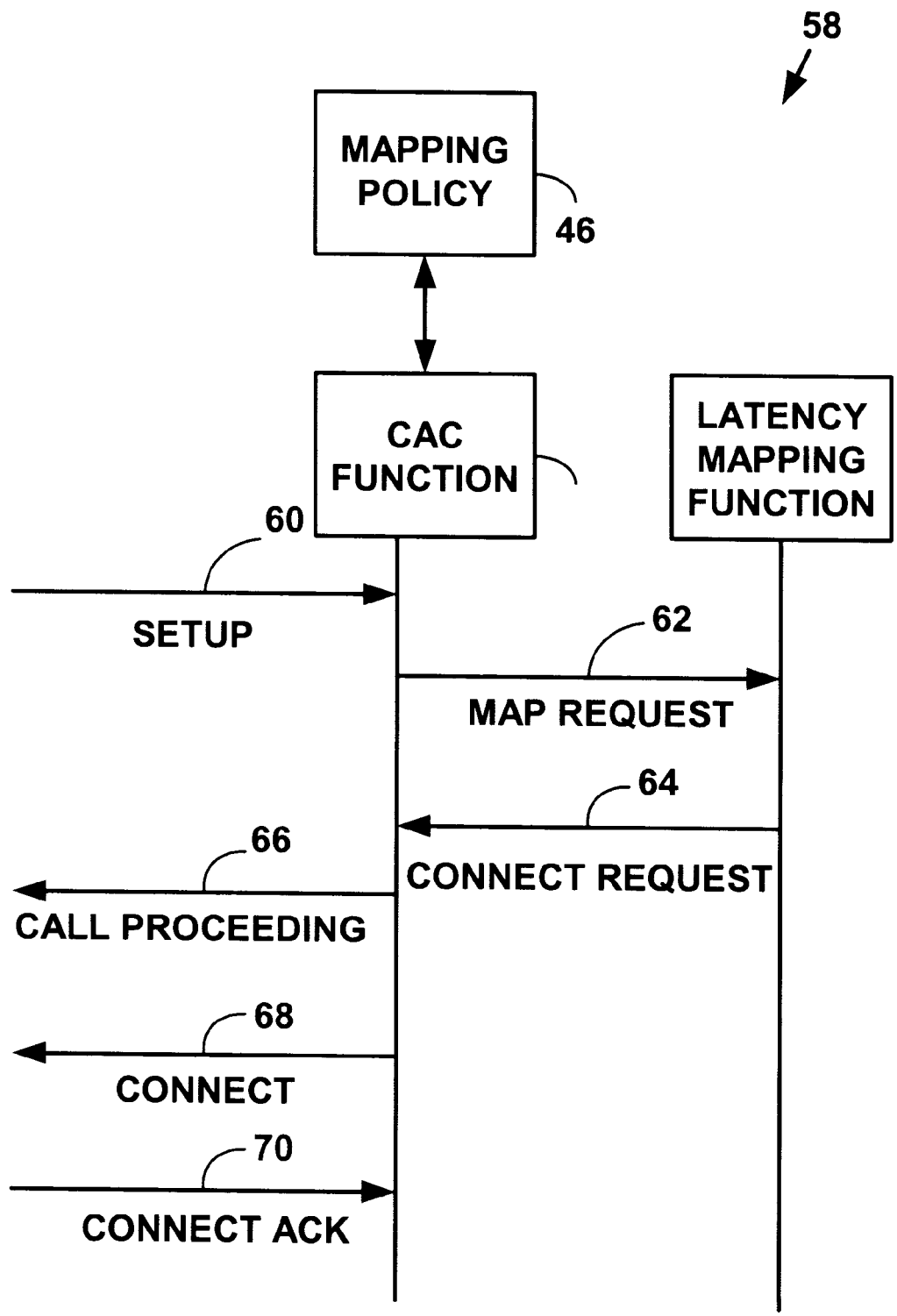

METHOD AND SYSTEM FOR MAPPING VIRTUAL CONNECTIONS TO ASYMMETRIC DIGITAL SUBSCRIBER LINE LATENCY PATHS

FIELD OF THE INVENTION

This invention relates to latency control in communication devices. More specifically it relates to a method for mapping service category requests for virtual connections to latency paths in asymmetric digital subscriber line transmission systems.

BACKGROUND OF THE INVENTION

Many applications used from digital computers are asymmetric. For example, video on demand, Internet access, intranet access, remote local area network access, multimedia access, and others are specialized services that typically require high data rates downstream, but have relatively low data rates demands upstream.

An Asymmetric Digital Subscriber Line ("ADSL"), is a communications technology that transmits an asymmetric data stream over a conventional twisted pair of telephone wires. An Asymmetric Digital Subscriber Line transmits a larger data rate downstream to a subscriber from a telephony switching office than from a subscriber back to the telephony switching office. Asymmetric Digital Subscriber Lines typically transmit about 1.5 Mega bits-per-second ("Mbps") to about 9 Mbps downstream to a subscriber, and about 16 kilo-bps ("kbps") to 640 kbps upstream back to a telephony switching office. The asymmetric data rates depend on a number of factors, including length of the twisted pair of copper wires, copper wire gauge, and cross-coupled interference.

An ADSL system typically comprises two asymmetric devices connected by a conventional twisted pair of copper wires. An ADSL Transmission Unit-Central ("ATU-C") is a device at one end of an ADSL connection at a telephony or other switching office. An ADSL Transmission Unit-Remote ("ATU-R") is a device at another end of an ADSL connection at a subscriber or customer site.

The ATU-R may be integrated into a service module. A service module typically converts received digital signals into signals suitable for particular subscriber or customer premise equipment. The ATU-C may be integrated within an access node. An access node typically includes digital loop carrier systems such as a Digital Subscriber Line Access Multiplexer ("DSLAM") concentrating individual connections to T1 lines, E1 lines cellular antenna sites, Private Branch Exchanges ("PBXs"), Optical Network Units ("ONUs") or other carrier systems.

ADSL systems typically use Discrete Multi-Tone Modulation ("DMT") for data transmission. Low speed services, such as Plain Old Telephone Service ("POTS"), are carried in a baseline modulation frequency or low frequency, while higher speed multimedia services are modulated at higher frequencies.

Some applications require transport of packet data. An Asynchronous Transfer Mode ("ATM") system can use high-speed services on ADSL systems as a physical layer to transport data packets. As is known in the art, ATM is a high-speed packet transmission mode. ATM segments and multiplexes data traffic into small, fixed-length units called "cells." A cell is 53-octects, with 5-octects for the cell header, and 48-octects for the cell data. ATM provides four service categoy classes that may use constant bit-rates, variable bit-rates, available bit-rates and unspecified bit-rate services. The four ATM service classes can be used to provide Quality-of-Service ("QoS") functionality.

Another high-speed packet transmission mode includes Frame Relay. As is known in the art, Frame Relay is packet-switching protocol for use on wide area networks ("WANs"). Frame relay transmits variable-length packets at up to 2 Mbps over predetermined, set paths known as PVCs (permanent virtual circuits).

An ADSL system typically includes one or more "splitters." Splitters are filters that separate high frequency and low frequency ADSL signals. A splitter may be integrated into ATU-C or ATU-R, physically separated from the ATU-C or ATU-R, or divided between high pass and low pass functionality, with the low pass functionality physically separated from the ATU-C or ATU-R.

An ADSL system can also be used without splitters. The Splitterless ADSL standard is called "G.lite." G.lite is a new standard that uses DMT baseline modulation delivering a maximum downstream bandwidth of about 1.4 Mbps, but is less sensitive to noise and other transmission problems.

Two modes of latency have been specified for ADSL systems. The purpose of latency is to provide a data path with a pre-determined delay sensitivity and reliability through an ADSL system that can be used to provide a service category. For example, a data path can be provided between an ADSL transmission unit and a virtual circuit connection being used for ATM, Frame Relay or transport protocols. The latency path is used for carrying user traffic that has different service requirements in terms of delay and reliability. Generally, two latency paths are defined: a "Fast" path and an "Interleaved" path. The Fast latency path corresponds to a lower reliability, shorter delay path. The Interleaved latency path corresponds to higher reliability, longer delay path.

There are several problems associated with mapping a latency paths between ADSLs and ATM, Frame Relay and other transport networks. One problem is that it is possible to use three or more latency classes on a latency path including: (1) single latency, that is not necessarily the same for each direction of transmission; (2) dual latency downstream with single latency upstream; and (3) dual latency both upstream and downstream. Multiple latency classes on a single latency path complicates any latency mapping.

Another problem is since the functionality of a latency path is typically located in a transmission convergence sub-layer, and a mapping mechanism is necessary to map a service request to a corresponding latency path. However, most mapping mechanisms known in art are dependent on the architecture of the transmission sub-layer and vary with the type of transmission hardware being used. In addition, most mapping mechanisms known in the art do not provide a mechanism to map service category requests such as quality-of-service requests or other service category requests to a latency path at an ADSL transmission convergence sub-layer.

Thus, it is desirable to have a generic mapping procedure that will map a service category request to an ADSL latency path. The generic mapping procedure should also be independent of the underlying architecture of the system it is used on and provide the ability to map quality-of-service requests and other service category requests to a latency path on an ADSL system.

SUMMARY OF THE INVENTION

In accordance with preferred embodiments of the present invention, some of the problems associated with ADSL mapping latency paths are overcome. A method and system for mapping virtual connections to ADSL latency paths is presented.

One aspect of the invention includes a method for latency path mapping in an asymmetric data transmission system. A request for virtual connection from a transport network (e.g., ATM, Frame Relay, etc.) with a desired service category (e.g., quality-of-service) and a desired latency is mapped to an ADSL device latency interface by checking a latency mapping policy. This mapping helps provide an end-to-end virtual connection with a desired service category and a desired latency using an ADSL device.

Another aspect of the invention includes a system for latency path mapping in an asymmetric data transmission system. The system includes a latency mapping policy, a connection admission control function and a latency mapping function. The mapping policy maps a desired service category to an ADSL latency path. The connection admission control function checks the mapping policy and calls a latency mapping function to establish a virtual connection including a desired latency path for a desired service category. The latency mapping function establishes a virtual connection including a desired latency path for a desired service category between a transport network interface port and an ADSL device latency interface port.

The present invention may help overcome some of the problems associated with latency mapping by providing an embedded service category mapping from a transport network to latency paths at an ADSL line transmission convergence sub-layer allowing differential services to be provided for user data based on a desired service category. The latency mapping mechanism help provide use of end-to-end service categories such as quality-of-service categories, over real-time ADSL links.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present inventions are described with reference to the following drawings, wherein:

FIG. 4 is a flow diagram illustrating a method for latency path mapping in an asymmetric data transmission system; and FIG. 5 is block diagram illustrating a data flow for an exemplary ATM-to-ADSL latency mapping.

DETAILED DESCRIPTION OF PREFERRED EMBODIMENTS

Exemplary Asymmetric Data Transmission System

Figure 1:
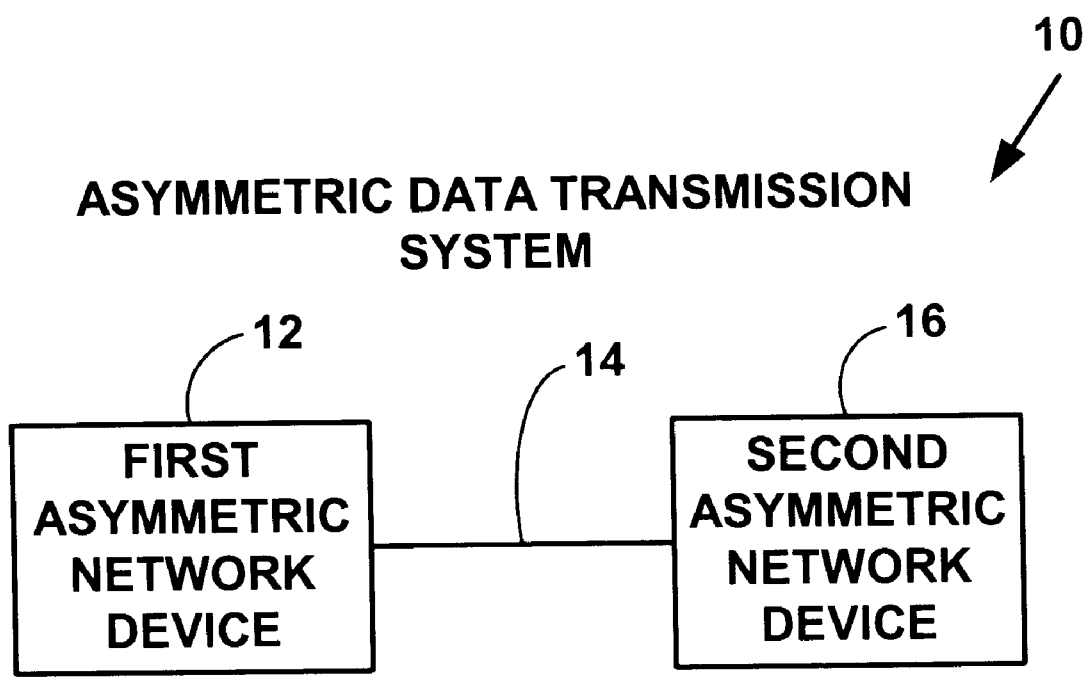
FIG. 1 is a block diagram illustrating an exemplary asymmetric data transmission system.

FIG. 1 is a block diagram illustrating an exemplary asymmetric data transmission system 10 for a preferred embodiment of the present invention. In the asymmetric data transmission system 10, data is transmitted at a higher data rate in a downstream direction, than in an upstream direction. However, the asymmetric data transmission can also be reversed. The asymmetric data transmission system 10 can also be used for symmetric data transmission. The asymmetric data transmission system 10 includes a first asymmetric network device 12, a connection 14, and a second asymmetric network device 16. However, the asymmetric data transmission system 10 is not limited the network devices and connection illustrated in FIG. 1, and more or fewer network devices and connections can also be used. Splitters are not illustrated in FIG. 1, and may or may not be used in the asymmetric data transmission system 10.

In one exemplary preferred embodiment of the present invention, the connection 14 is conventional twisted pair of copper wires. The first asymmetric network device 12 is an Asymmetric Digital Subscriber Line ("ADSL") Transmission Unit-Remote ("ATU-R"). The second asymmetric network device 16 is an ADSL Transmission Unit-Central ("ATU-C"). However, the present invention is not limited to this exemplary preferred embodiment and other network devices and connections can also be used.

The Asymmetric network devices 12, 16 for preferred embodiments of the present invention include network devices that can interact with the asymmetric network system 10 based on all or part of standards proposed by the Institute of Electrical and Electronic Engineers ("IEEE"), International Telecommunications Union-Telecommunication Standardization Sector ("ITU"), Internet Engineering Task Force ("IETF"), American National Standard Institute ("ANSI"), or the ADSL Forum. However, network devices based on other standards could also be used. IEEE standards can be found on the World Wide Web at the Universal Resource Locator ("URL") "www.ieee-.org." The ITU, (formerly known as the CCITT) standards can be found at the URL "www.itu.ch." IETF standards can be found at the URL "www.ietf.org." The ANSI standards can be found at the URL "www.ansi.org." ADSL Forum documents can be found at the URL "www.adsl.com."

The ANSI standard "Network and Customer Installation Interfaces—Asymmetric Digital Subscriber Line (ADSL) Metallic interface," ANSI-T1.413-1995, and the ITU standards "Asymmetrical digital subscriber line (ADSL) transceiver," ITU-G.992.1-1999, and "Splitterless Asymmetrical Digital Subscriber Line Transceivers," ITU-G.992.2-1999, are incorporated herein by reference.

In one exemplary preferred embodiment of the present invention, the asymmetric data transmission system 10 includes asymmetric network devices compliant with all or part of ANSI or ITU ADSL standards. (e.g., ANSI-T1.413-1995 or ITU-G.992.1-1999). In another exemplary preferred embodiment of the present invention, the asymmetric data transmission system 10 includes a splitter-less ADSL data transmission system with network devices compliant with all or part of ITU splitter-less ADSL standards. (e.g., ITU-G.992.2-1999). The first asymmetric network device 12 is an ADSL ATU-R device, the second asymmetric device 16 is an ADSL ATU-C device, and the connection 14 is a conventional twisted pair of copper wires. However, the present invention is not limited to this embodiment and other asymmetric network devices and connections can also be used.

An operating environment for asymmetric network devices 12,16 of the present invention include a processing system with one or more high speed Central Processing Unit(s) ("CPU") and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed" or "CPU executed."

It will be appreciated that acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

Asymmetric Digital Subscriber Line Data Transmission System

Figure 2:
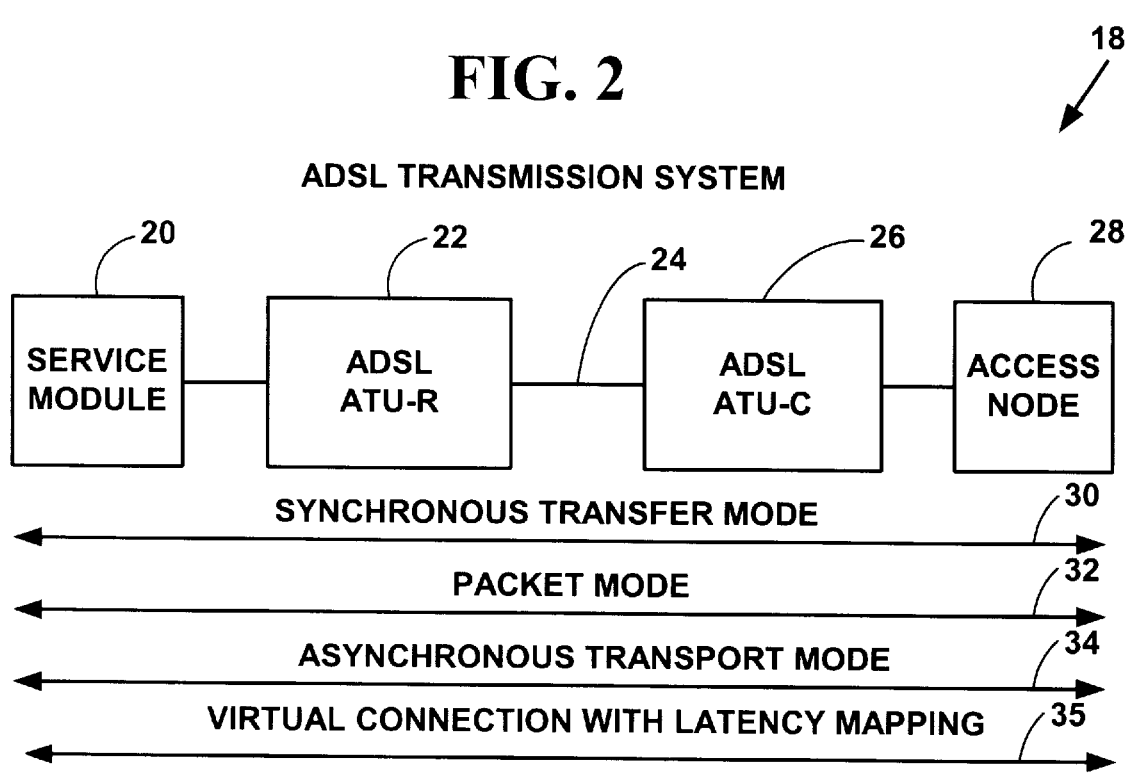
FIG. 2 is a block diagram illustrating an exemplary ADSL data transmission system.

FIG. 2 is a block diagram illustrating an exemplary asymmetric digital subscriber line data transmission system 18 for one exemplary a preferred embodiment of the present invention. In the asymmetric digital subscriber line data transmission system 18, data is transmitted at a higher data rate in downstream direction, than in an upstream direction. However, the asymmetric data transmission can also be reversed. The data transmission can also be symmetric. The asymmetric data asymmetric digital subscriber line transmission system 18 includes a service module 20, an ADSL ATU-R interface 22, an ADSL connection 24 comprising a twisted pair of copper wires, an ADSL ATU-C interface 26 and an access node 28 (e.g., a Digital Subscriber Line Access Multiplexer ("DSLAM")).

The asymmetric data transmission system 18 also includes the capability for a synchronous transfer mode 30, a packet transfer mode 32 an ATM 34 transfer mode, and creation of a virtual connection with a desired latency mapping 35 for a desired service category as is explained below. However, the asymmetric data transmission system 18 is not limited the network devices, connection or transfer modes illustrated in FIG. 2, and more or fewer network devices connections or transfer modes can also be used.

As was described above, an ADSL ATU-R interface 22 is a network device at an end of the ADSL connection 24 at a subscriber or customer site. Although illustrated as a discrete component, the ADSL ATU-R device 22 may be integrated into a service module 20. The ADSL ATU-C device 26 is a network device at an end of the ADSL connection 24 at a telephony switch or other switching device. Although illustrated as a discrete component, the ADSL ATU-C interface 26 may also be integrated within the access node 28. The ADSL ATU-R 22 and ADSL ATU-C 26 devices include but are not limited to ADSL devices from 3Com Corporation, of Santa Clara, Calif., Cisco Systems of San Jose, Calif., Erickson Corporation, of Stockholm, Sweden, and others.

The service module 20 converts digital signals into signals suitable for use on a subscriber or customer site. The access node 28 typically includes digital loop carrier systems concentrating individual voice lines to T1 lines, E1 lines, cellular antenna sites, Private Branch Exchanges ("PBXs"), Optical Network Units ("ONUs") and other wireline and wireless carrier systems. In one exemplary preferred embodiment of the present invention, the asymmetric data transmission system 18 includes an ADSL network device compliant with all or part of ANSI or ITU ADSL standards (e.g., ANSI-T1.413-1995 or ITU-G.992.1-1999). In another exemplary preferred embodiment of the present invention, the asymmetric data transmission system 18 includes a splitterless ADSL data transmission system, or G.lite data transmission system. The network devices in such a system are compliant with all or part of the ITU splitterless ADSL standard (e.g., ITU-G.992.2-1999). Splitters are not illustrated in FIG. 2, and may or may not be used in asymmetric data transmission system 18. However, the present invention is not limited to this embodiment and other asymmetric data transmission systems and other standards can also be used.

Exemplary Asymmetric Digital Subscriber Line Access Node

Figure 3:
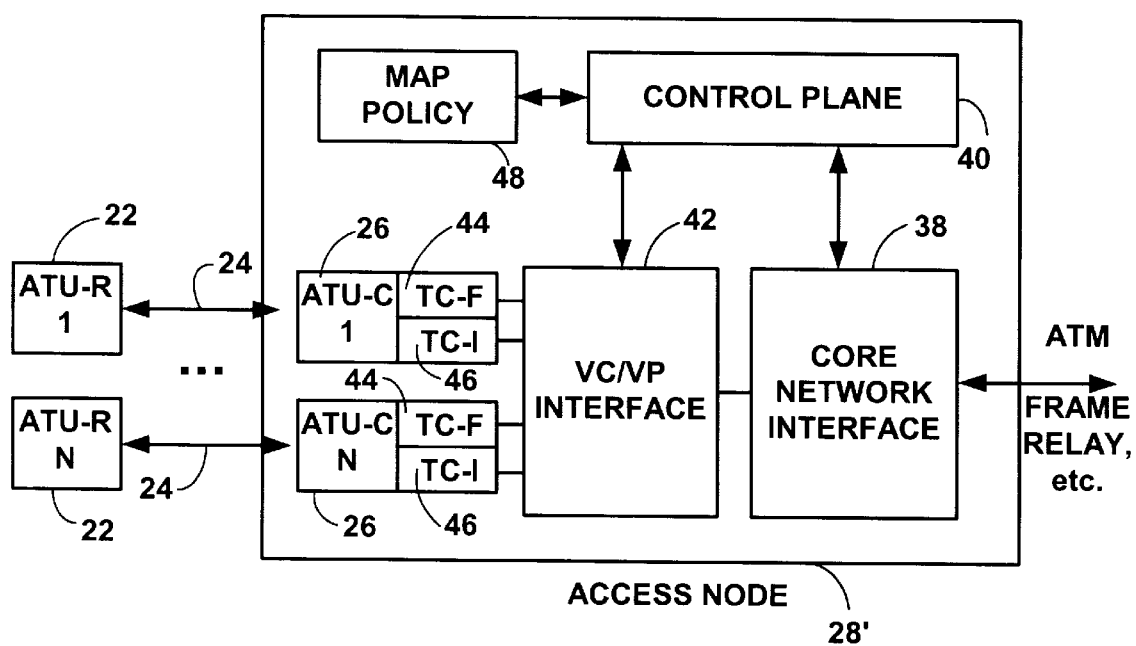
FIG. 3 is a block diagram illustrating an exemplary access node used in the exemplary ADSL data transmission system of FIG. 2.

FIG. 3 is a block diagram illustrating an exemplary access node 36 used in the ADSL transmission system 18. The access node 36 includes a core network interface 38, a control plane 40, a virtual channel/virtual path interface 42, and multiple latency interfaces 44, 46, a latency mapping policy 48 and a multiple ADSL ATU-C 26 interfaces. However, more, fewer or equivalent components can be used in the access node 36, and the present invention is not limited to the described components.

The access node 36 serves as a transport multiplexer/concentrator between a transport network (e.g., ATM or Frame Relay, etc.) and a customer premise distribution network or other network. In the outgoing direction it may perform routing/demultiplexing, while in the incoming direction it may perform multiplexing/concentration and higher layer functions, such as latency mapping described below.

In an exemplary preferred embodiment of the present invention, the core network interface 38 of the access node 36 includes an ATM, Frame Relay, or other interface to a corresponding ATM, Frame Relay, or other transport network. However, the present invention is not limited to ATM or Frame Relay interfaces and other network core interfaces could also be used with other transport networks.

As was discussed above, ATM is a high-speed packet transmission mode. ATM segments and multiplexes data traffic into small, fixed-length units called "cells." A cell is 53-octects, with 5-octects for the cell header, and 48-octects for the cell data. ATM often uses ADSL technologies as a physical layer to transmit packet data. For more information on ATM, see "B-ISDN ATM Adaptation Layer specification," ITU-I.363.3-1996, and "Functional characteristics of ATM equipment, ITU-I.732-1996, and "Functional Architecture of transport networks based on ATM," ITU-I.326-1995, all of which are incorporated herein by reference.

For more information on using ATM with ADSL see, "ATM over ADSL Recommendation," TR-017, ADSL Forum, March 1999, "ADSL Forum Recommendation for ATM Layer of ADSLs," TR-021, ADSL Forum, December 1998, "T1.413 Issue 2 ATM basedADSL ICS," TR-026, September 1999, all of which are incorporated herein by reference.

As is known in the art, the ATM layer provides a range of alternative service types/classes for the transport of octet steams/messages generated by higher protocol layers. The ATM service types can be used to provide Class-of-Service ("CoS") or Quality-of-Service ("QoS") on a connection.

As is known in the art, CoS provides a reliable (e.g., error free, in sequence, with no loss of duplication) transport facility independent of a QoS. CoS parameters include maximum downstream data rates, maximum upstream data rates, upstream channel priority, guaranteed minimum data rates, guaranteed maximum data rate and other parameters.

QoS collectively specifies the performance of a network service that a device expects on a network. QoS parameters include transit delay expected to deliver data to a specific destination, the level of protection from unauthorized monitoring or modification of data, cost for delivery of data, expected residual error probability, the relative priority associated with the is data and other parameters.

The ATM services types for QoS are classified according to three criteria: (1) the existence of a timing relationship between a source and destination; (2) a bit rate associated with a transfer; and (3) a connection mode. Table 1 illustrates ATM services types.

TABLE 1

| Service Category Identifier | Service | Description |
|---|---|---|
| CBR | Constant Bit Rate | CBR service category is intended for real-time applications, i.e., those requiring tightly constrained delay and delay variation, as would be appropriate for voice and video applications. Typically a connetion-oriented service. Timing required between source and destination. |
| rt-VBR | Real-time Variable Bit Rate | The real-time VBR service category is intended for real-time applications (i.e., those requiring tightly constrained delay and delay variation), as would be appropriate for voice and video applications. Typically a connection-oriented service. Timing required between source and destination. |
| nrt-VBR | Non-real-time Variable Bit Rate | The non-real-time VBR service category is intended for non-real-time applications that have bursty traffic characteristics. Connection-oriented or connection-less service. No timing required between source and destination. |
| UBR | Unspecified Bit Rate | The UBR service category is intended for non-real-time applications (i.e., those not requiring tightly constrained delay and delay variation). Examples of such applications are traditional computer communications applications such as file transfer and Email. UBR sources are expected to be bursty. UBR service does not specify traffic-related service guarantees. Specifically, UBR does not include the notion of a per-connection negotiated bandwidth. Typically a connection-less service. |

TABLE 1-continued

| Service Category Identifier | Service | Description |
|---|---|---|
| ABR | Available Bit Rate | ABR is an ATM layer service category for which the limiting ATM layer-transfer characteristics provided by the network may change subsequent to connection establishment. Connection-oriented or connection-less service. |

As was discussed above, Frame Relay is packet-switching protocol typically used on Wide Area Networks ("WANs"). Frame relay transmits variable-length packets at up to 2 Mbps over predetermined, set paths known as PVCs (permanent virtual circuits). For more information on Frame Relay see "Framework for Frame Mode Bearer Services," ITU-I.122-1993, "Frame Mode Bearer Services," ITU-I.223-1992, "Frame Mode Bearer Services Interworking," ITU-I.555-1992, "Signaling Specification for Frame Relay Bearer Service for DSS1," ANSI-T1.617-1991 and "Core Aspects of Frame Protocol for Use with Frame Relay Bearer Service," ANSI-T1.618-1991, all of which are incorporated by reference. Frame Relay can also provide service categories similar to those described for ATM.

The control plane 40 is responsible for establishing calls, establishing circuits and managing connections. The control plane 40 manages frame-mode bearer services, packet-mode services and circuit-switching services. The control plane 40 includes functionality for control signaling and Connection Admission Control ("CAC").

The virtual channel/virtual path interface 42 includes Virtual Path ("VP") and Virtual Channel ("VC") management. As is known in the art, a VC is a channel set up between two end users through a network, and a variable-rate, full duplex flow of cells is exchanged over the channel. VCs are used for user-network exchange (e.g., control signaling) and network-network exchanges (e.g., network management and routing). A VP is a bundle of VCs that have the same endpoints in a network. Typically all of the cells flowing over all of the VCs in a single VP are processed together. The virtual channel/virtual path interface 42 manages ATM Virtual Path Identifiers ("VPI"), Virtual Channel Identifiers ("VCI"), and Frame Relay Data Link Connection Identifiers ("DLCI") and other virtual connection identifiers. The virtual channel/virtual path interface 42 may also include other functionality such as latency mapping functionality.

If ATM is being used, the virtual channel/virtual path interface 42 manages VPIs and VCIs that identify an ATM virtual connection that has an ATM QoS illustrated in Table 1. If Frame Relay is being used the virtual channel/virtual path interface 42 manages the DCLIs with service categories similar to those used for ATM and illustrated in Table 1.

The multiple latency interfaces 44, 46 include multiple Transmission Convergence ("TC") sub-layer interfaces. A "TC-F" interface 44 is used for a "Fast" latency path and a "TC-I" interface 46 is used for an "Interleaved" latency path. The multiple latency interfaces include multiple ADSL ATU-C 26 interfaces, which are connected to multiple ADSL ATU-R interfaces 22 over multiple connections 24.

The mapping policy 48 is a set of rules that specify latency mapping for a desired service category including Cos or QoS. In a preferred embodiment of the present invention, the mapping policy 48 is defined and configured by a network administrator or by a user who has responsibility to manage the access node 36. However, the present invention is not limited to the mapping policy 48 created by a network administrator, and the mapping policy 48 can also be created by others.

Latency Mapping Over Virtual Connections in an ADSL System

FIG. 4 is a flow diagram illustrating a Method 50 for latency path mapping in an asymmetric data transmission system. At Step 52, a control signal is received from a transport network on an ADSL access node on a first connection to request a desired service category on a virtual connection between the ADSL access node connected to the transport network and an ADSL service module connected to a customer premise distribution network. At Step 54, a latency mapping policy is checked on the ADSL access node to determine a desired latency mapping for the virtual connection based on the desired service category. At Step 56, the desired latency mapping for the virtual connection is created between the ADSL access node and the ADSL service module over a second connection, thereby providing a virtual connection with a desired service category including a desired latency mapping between the transport network and the customer premise distribution network via the ADSL access node and the ADSL service module.

In one specific exemplary preferred embodiment of the invention, Method 50 is used on an ADSL transmission system 18 (FIG. 2). However, the present invention is not limited to such an embodiment and other ADSL transmission systems can also be used.

In such an embodiment, at Step 52, a control signal is received from a transport network, such as ATM, Frame Relay and others, on an ADSL access node 36 on a first connection to request a desired service category on a virtual connection between the ADSL access node 36 connected to the transport network and an ADSL service module 20 connected to a premise distribution network.

The desired service category includes a CoS, QoS or other service category for ATM, Frame Relay or other transport protocols used on a corresponding transport network. The control signal includes an ATM call setup signal, a Frame Relay call setup signal or other control signals that include a desired service category indicator.

At Step 54, a latency mapping policy 48 is checked from the access node 36 to determine a desired latency mapping for the virtual connection based on the desired service category. In one preferred embodiment of the present invention, the latency mapping policy 48 (FIG. 3) is checked from a Connection Admission Control function ("CAC") in the control plane 40. As is known in the art, the CAC function is not standardized, but a variable function maintained by a transport network service provider. However, the latency mapping policy 48 can be checked from other components and the present invention is not limited to checking the mapping policy from a CAC function in the control plane 40 or a latency mapping policy 48 maintained by a transport network service provider. Table 2 illustrates an exemplary latency mapping policy 48. However, the present invention is not limited to the exemplary latency mapping policy illustrated in Table 2 and other latency mapping policies can also be used.

TABLE 2

| Service Category Request | ADSL Latency Mapping |
|---|---|
| CBR | Fast |
| rt-VBR | Fast |
| nrt-VBR | Interleaved |
| UBR | Interleaved or Fast, depending on a specified application. |
| ABR | Interleaved or Fast, depending on a specified application. |

At Step 56, the desired latency mapping for the virtual connection is created between the ADSL access node 36 and the ADSL service module 20 over a second connection 24, thereby providing a virtual connection with a desired service category including a desired latency mapping between the transport network and the customer premise distribution network via the ADSL access node 36 and the ADSL service module 20.

In one preferred embodiment of the present invention, creating the desired latency mapping for the virtual connection includes creating the desired latency mapping at a Transmission Convergence ("TC") sub-layer on the ADSL access node 36. If ATM is being used, a VPI or VCI is mapped to a TC sub-layer latency type after a CAC function in the control plane 40 consults the mapping policy 48. The CAC function performs latency mapping by for the desired service category by calling a latency mapping function. The desired latency mapping is created between a first port (e.g., ATM, Frame Relay, etc. port) on a transport network interface and a second port on a latency interface (e.g., TC-F 44 or TC-I 46) on an ADSL ATU-C interface 26.

Exemplary ATM-to-ADSL Latency Mapping

In one specific exemplary example, an ATM port, such as ATM port zero ("ATM0") or ATM port one ("ATM1") is mapped to a TC-F 44 or TC-I 46 port on an ADSL ATU-C interface 26. An ATM Cell specific TC sub-layer ("Cell TC") is provided for each latency path separately. However, the present invention is not limited to such an embodiment, and other latency mappings can also be used.

FIG. 5 is block diagram illustrating a data flow 58 for an exemplary ATM-to-ADSL latency mapping. A call SETUP message 60, including a desired service category for a Switched Virtual Connection ("SVC") is received on the access node 36 (e.g., FIG. 4, at Step 52). The call SETUP message 60 is passed to a CAC function in the control plane 40 (FIG. 3). The CAC function determines if there are enough transport resources to grant the SVC. The CAC function in the control plane 40 also checks the mapping policy 48 to determine a latency mapping for the desired service category (e.g., QoS) received in the call SETUP message 60 (e.g., at Step 54).

The CAC creates a desired latency mapping (e.g., at Step 56) by calling a latency mapping function. In one preferred embodiment of the present invention, the latency function exists in the virtual channel/virtual path interface 42. However, the present invention is not limited to this implementation, and the latency function can also exists in other components of the ADSL access node 36 (e.g., the control plane 40). The latency mapping function can exist on the control plane 40 or in the virtual channel/virtual path interface 42.

The latency mapping function performs latency mapping from an ATM port to a TC-F 44 or TC-I 46 port on an ADSL ATU-C interface 26. The mapping is created before the CAC grants the call SETUP request 60. The latency mapping function sends a connect request indication 64 back to the CAC function indicating the desired latency mapping has been completed. The CAC function sends a CALL PROCEEDING message 66 to the network device that sent the call SETUP message 60 indicating a SVC has been allocated. The CAC function sends a CONNECT message 68 indicating the call with the desired service category has been accepted on a SVC by the access node 36. The CAC function receives a CONNECT ACKNOWLEDGEMENT 70 from the initiating network device indicating call acceptance has been acknowledged on a SVC. An end-to-end virtual connection with a desired service category including a desired latency mapping via the ADSL access node 36 is thereby created.

FIG. 5 illustrates latency mapping for ATM-to-ADSL. However, other transport protocols (e.g., Frame Relay, etc.) from their corresponding transport network would be mapped in a similar manner, and the present invention is not limited to ATM-to-ADSL latency mapping.

The methods and system described herein may offer the following advantages. An embedded service category mapping from a transport network to latency paths at an ADSL transmission convergence sub-layer allow differential services to be provided for user data from a premise distribution network based on a desired service category. The differential services on an ADSL device can be based on characteristics of the data traffic including: sensitivity to delay, throughput and reliability. The differential services on an ADSL device can be used to provide delay sensitive services such as multimedia services, ADSL voice services, and other delay sensitive services. The latency mapping mechanism at an ADSL link may help provide end-to-end virtual connections over real-time ADSL links.

It should be understood that the programs, processes, methods and systems described herein are not related or limited to any particular type of computer or network system (hardware or software), unless indicated otherwise. Various types of general purpose or specialized components may be used with or perform operations in accordance with the teachings described herein.

In view of the wide variety of embodiments to which the principles of the present invention can be applied, it should be understood that the illustrated embodiments are exemplary only. The illustrated embodiments should not be taken as limiting the scope of the present invention.

For example, the steps of the flow diagrams may be taken in sequences other than those described, and more or fewer elements may be used in the block diagrams. While various elements of the preferred embodiments have been described as being implemented in software, in other embodiments hardware or firmware implementations and vice-versa may alternatively be used.

The claims should not be read as limited to the described order or elements unless stated to that effect. Therefore, all embodiments that come within the scope and spirit of the following claims and equivalents thereto are claimed as the invention.

We claim:

1. A method for latency path mapping in an asymmetric data transmission system, comprising:

receiving a control signal from a transport network on an asymmetric digital subscriber line access node on a first connection to request a desired service category on a virtual connection between the asymmetric digital subscriber line access node connected to the transport network and an asymmetric digital subscriber line service module connected to a customer premise distribution network;

checking a latency mapping policy on the asymmetric digital subscriber line access node to determine a desired latency mapping for the virtual connection based on the desired service category;

creating the desired latency mapping for the virtual connection between the asymmetric digital subscriber line access node and the asymmetric digital subscriber line service module over a second connection, thereby providing a virtual connection with a desired service category including a desired latency mapping between the transport network and the customer premise distribution network via the asymmetric digital subscriber line access node and the asymmetric digital subscriber line service module.

2. A computer readable medium having stored therein instructions for causing a central processing unit to execute the method of claim 1.

3. The method of claim 1 wherein the transport network is any of an Asynchronous Transport Mode network or a Frame Relay network.

4. The method of claim 1 wherein the step of checking a latency mapping policy includes checking a latency mapping policy in a control plane in the asymmetric digital subscriber line access node.

5. The method of claim 4 wherein the step of checking a latency mapping policy in a control plane on the asymmetric digital subscriber line access node includes checking a latency mapping policy from a Connection Access Control function in the control plane in the access node.

6. The method of claim 1 wherein the step of receiving a control signal from a transport network on a first connection on an access node to request a desired service category on a virtual connection includes receiving a control signal for a desired quality-of-service category.

7. The method of claim 1 wherein the step of receiving a control signal from a transport network on a first connection on an asymmetric digital subscriber line access node to request a desired service category on a virtual connection includes receiving an Asynchronous Transfer Mode call setup signal or a Frame Relay call setup signal including a desired quality-of-service.

8. The method of claim 1 wherein the step creating the desired latency mapping for the virtual connection includes creating the desired latency mapping at a transmission convergence sub-layer on the asymmetric digital subscriber line access node.

9. The method of claim 1 wherein the step of creating the desired latency mapping for the virtual connection includes creating the desired latency mapping between a first port on a transport network interface and a second port on an asymmetric digital subscriber line latency interface on the asymmetric digital subscriber line access node.

10. The method of claim 1 wherein the second connection includes a connection between an asymmetric transmission unit-central interface on the asymmetric digital subscriber line access node and an asymmetric transmission unit-remote on the asymmetric digital subscriber line device.

11. The method of claim 1 wherein the step of creating the desired latency mapping for the virtual connection comprises:

calling a latency mapping function from a connection admission control function with a latency mapping request; and performing a desired latency mapping from the latency mapping function; and returning a connection indication from the latency mapping function to the connection admission control function.

12. The method of claim 11 wherein the connection admission control function is in a control plane on the asymmetric digital subscriber line access node and the latency mapping function is in a virtual channel/virtual path interface on the asymmetric digital subscriber line access node.

13. The method of claim 11 wherein the connection admission control function and the latency mapping function are in a control plane on the asymmetric digital subscriber line access node.

14. An access node in an asymmetric data transmission system, the access node comprising in combination:
- a transport network interface for connecting to a transport network;
- a virtual channel/virtual path interface for managing virtual channels and virtual paths used on a virtual connection;
- a control plane for establishing calls, establishing circuits and managing virtual connections;
- a plurality of latency interfaces for establishing fast latency paths and interleaved latency paths; and
- a plurality of asymmetric digital subscriber line transmission unit-central interfaces for connecting the transport network to a plurality of asymmetric digital subscriber line devices at a plurality of asymmetric digital subscribed line transmission unit-remote interfaces.

15. The access node of claim 14 further comprising a connection to a asymmetric digital subscriber device including an asymmetric digital subscriber line transmission unit-remote interface.

16. The access node of claim 15 wherein the connection includes a twisted pair of copper wires.

17. A latency mapping system for an asymmetric data transmission system, comprising in combination:
- a latency mapping policy for mapping a desired transport network service category to an asymmetric digital subscriber line latency path;
- a connection admission control function for checking the mapping policy and calling a latency mapping function to establish a virtual connection including a desired latency path for a desired service category; and
- a latency mapping function for establishing a virtual connection including a desired latency path for a desired service category between a transport network interface port and an asymmetric digital subscriber line device latency interface port.

18. A method for latency path mapping in an asymmetric data transmission system, comprising:
- receiving a call setup message from an asynchronous transport mode network on an asymmetric digital subscriber line access node on a first connection to request a desired service category on a virtual connection between the asymmetric digital subscriber line access node connected to the asynchronous transport mode network and an asymmetric digital subscriber line service module connected to a premise distribution network;
- checking a latency mapping policy on the asymmetric digital subscriber line access node to determine a desired latency mapping for the virtual connection based on the desired service category;
- creating the desired latency mapping for the virtual connection between the asymmetric digital subscriber line access node and the asymmetric digital subscriber line service module over a second connection by creating the desired latency mapping between an asynchronous transport mode port and a latency interface port on an asymmetric digital subscriber line transmission unit-central interface on the asymmetric digital subscriber line access node, thereby providing a virtual connection with a desired service category including a desired latency mapping between the asynchronous transport mode network and the customer premise distribution network via the asymmetric digital subscriber line access node and the asymmetric digital subscriber line service module.

19. A computer readable medium having stored therein instructions for causing a central processing unit to execute the method of claim 18.

20. The method of claim 18 wherein the step creating the desired latency mapping for the virtual connection includes creating the desired latency mapping at an asymmetric digital subscriber line transmission convergence sub-layer on the asymmetric digital subscriber line access node.

* * * * *